UNITED STATES PATENT OFFICE.

GEORGE E. MILLAR, OF AUSTIN, NEVADA.

BLACKING COMPOUND.

SPECIFICATION forming part of Letters Patent No. 241,876, dated May 24, 1881.

Application filed September 28, 1880. (No specimens.)

*To all whom it may concern:*

Be it known that I, GEORGE E. MILLAR, of Austin, county of Lander, and State of Nevada, have invented an Improved Blacking Compound; and I hereby declare the following to be a full, clear, and exact description thereof.

My invention relates to a new and useful blacking compound for boots, shoes, harness, carriage-tops, trunks, and other leather articles; and it consists of sulphate of zinc, alcohol, shellac, camphor, and lamp-black, mixed in certain proportions and treated in a manner which will be hereinafter more fully described.

The object of my invention is to provide a blacking compound which I believe to be superior to anything yet discovered. Its qualities are durability, susceptibility of high polish, cleanliness, imperviousness to water and snow, protection to the leather, harmlessness therein, and capacity for rapid drying.

In order that any one may fully understand my discovery, I will explain my method of compounding the various ingredients, showing the quantities of each which I have found by practical experiment to be best, and also I will explain the best mode of application.

I take one-half ounce of sulphate of zinc, gathered from the waste or evaporations of a common Morse telegraphic battery, and put it into a three-ounce vial of alcohol. I cork the vial tightly and shake well and often. I next take two ounces of shellac and put it into a sixteen-ounce vial with sufficient alcohol to dissolve it, (say alcohol enough to half fill the bottle.) I then cork the bottle tightly and seal it with wax. It should be kept warm and shaken often. When the shellac is dissolved I put into the bottle with it three-fourths of an ounce of camphor and shake it well. All this time I shake at intervals the smaller vial containing the sulphate of zinc and alcohol. After the camphor in the larger vial has dissolved I add thereto one-fourth of an ounce of lamp-black and shake it up well until it becomes thoroughly mixed. Then I take the smaller bottle and filter its contents into the larger one, cork tightly, and seal with sealing-wax, and if the alcohol be sufficiently strong all will be dissolved and ready for use in two days. A slight variation from the exact proportion of these ingredients would make no difference.

When I wish to apply my blacking I first shake it well before application; then with a small brush lay it on over the shoe or other leather. I take care to lay it on evenly. There is no need to rub it into the leather. It is so volatile that in about two minutes it is dry, and then may be seen the utility of my discovery in the desirable effects obtained. It retains the same brilliancy of polish when dry as when first put on, and does not, like most blackings, fade in the drying. When dry it is clean and will not soil at all, and it may be moistened and rubbed without either losing its luster, soiling, or coming off—in fact, to wet it seems to brighten it. It does not injure the leather, but serves as a protection against the dust and dirt, and prevents it from rotting. The polish is a lasting one, fading with fresh dirt, which, when rubbed off with a wet cloth, leaves the polish as good as before, and it will remain so as long as there is any of the blacking left. It is water-proof; moisture glances readily from it and leaves it bright; especially is this true of snow. Its quality of not being rubbed off by water renders it especially useful for ladies' shoes, as there is no danger in wet weather of soiling the skirts. The moment it dries it cannot be rubbed off, and this quality, together with its imperviousness to water, constitutes the great utility of my discovery. It is convenient of application. To leather which has before been polished with it the application need be made but once.

If at any time the blacking should become thick, it can be thinned by adding a little alcohol.

My compound combines all the best effects of a blacking, and can be used for gentlemen's shoes as well as for those of ladies.

Having thus described my invention, what I claim as new, and desire to secure by Letters Patent, is—

A blacking compound consisting of sulphate of zinc, alcohol, shellac, camphor, and lamp-black, in about the proportions and prepared in the manner herein described.

In witness whereof I have hereunto set my hand.

GEO. E. MILLAR.

Witnesses:
H. H. WARNER,
GEORGE W. DOCKROW.